(12) United States Patent
Katano

(10) Patent No.: US 11,298,868 B2
(45) Date of Patent: Apr. 12, 2022

(54) MANUFACTURING METHOD OF REINFORCED LAYER

(71) Applicant: TOYOTA JIDOSHA KABUSHIKI KAISHA, Toyota (JP)

(72) Inventor: Koji Katano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/231,093

(22) Filed: Apr. 15, 2021

(65) Prior Publication Data
US 2022/0032531 A1 Feb. 3, 2022

(30) Foreign Application Priority Data
Aug. 3, 2020 (JP) .............................. JP2020-131375

(51) Int. Cl.
| B29C 53/60 | (2006.01) |
| B29C 53/58 | (2006.01) |
| F17C 1/06 | (2006.01) |
| B29L 31/00 | (2006.01) |

(52) U.S. Cl.
CPC .......... *B29C 53/602* (2013.01); *B29C 53/587* (2013.01); *F17C 1/06* (2013.01); *B29L 2031/7156* (2013.01); *F17C 2201/0109* (2013.01); *F17C 2203/067* (2013.01); *F17C 2203/0621* (2013.01); *F17C 2209/2163* (2013.01)

(58) Field of Classification Search
CPC ....... B29C 53/602; B29C 53/587; F17C 1/06; F17C 2201/0109; F17C 2203/0621; F17C 2203/067; F17C 2209/2163; B29L 2031/7156
See application file for complete search history.

(56) References Cited

U.S. PATENT DOCUMENTS

2017/0136716 A1* 5/2017 Shindo .................... B29C 70/86
2017/0297259 A1* 10/2017 Otsubo .................... F17C 1/06

FOREIGN PATENT DOCUMENTS

| CA | 3 011 556 A1 | 8/2017 |
| JP | 2017-180521 A | 10/2017 |
| JP | 2019-044937 A | 3/2019 |
| JP | 2019-507851 A | 3/2019 |

* cited by examiner

*Primary Examiner* — Vishal I Patel
(74) *Attorney, Agent, or Firm* — Finnegan, Henderson, Farabow, Garrett & Dunner, LLP

(57) ABSTRACT

A manufacturing method for manufacturing a reinforced layer constituting a high-pressure tank includes: a first forming step of forming a cylindrical pipe portion and extending in an axial direction of the high-pressure tank, the pipe portion including a first end portion including a first end and a second end portion including a second end, the pipe portion being formed to have a first stepped portion such that the first stepped portion projects outwardly at a position distanced from the first end in the axial direction by a first distance; a first placing step of placing the first end inside a first dome portion by moving at least either of the first dome portion and the pipe portion until a first bottom end portion of the first dome portion abuts with the first stepped portion; and a first joining step of joining the pipe portion to the first dome portion.

4 Claims, 4 Drawing Sheets

MANUFACTURING METHOD OF REINFORCED LAYER

CROSS-REFERENCE TO RELATED APPLICATION

This application claims priority to Japanese Patent Application No. 2020-131375 filed on Aug. 3, 2020, incorporated herein by reference in its entirety.

BACKGROUND

1. Technical Field

This disclosure relates to a manufacturing method of a reinforced layer.

2. Description of Related Art

In the related art, there is a method for manufacturing a high-pressure tank such that a fiber reinforced resin layer (hereinafter also referred to as a reinforced layer) is formed by winding a fiber bundle around a liner by a filament winding method (for example, Japanese Unexamined Patent Application Publication No. 2019-044937 (JP 2019-044937 A)).

SUMMARY

The inventors of this disclosure newly devised a method for forming a reinforced layer by forming a helical layer on an outer surface of a joined body obtained by joining, to each other, a pipe portion and a dome portion that are formed separately, instead of the method in the related art. The new manufacturing method has such a possibility that the overall length of the reinforced layer may vary because the pipe portion and the dome portion that are formed separately are joined to each other.

This disclosure is achievable in the following aspects.

(1) One aspect of this disclosure provides a manufacturing method for manufacturing a reinforced layer constituting a high-pressure tank. The manufacturing method includes: a first forming step of forming a cylindrical pipe portion made of fiber reinforced resin and extending in an axial direction of the high-pressure tank, the pipe portion including a first end portion including a first end in the axial direction and a second end portion including a second end in the axial direction, the pipe portion being formed to have a first stepped portion formed in the first end portion such that the first stepped portion projects outwardly at a position distanced from the first end in the axial direction by a first distance determined in advance; a second forming step of forming a first dome portion made of fiber reinforced resin and having a hemispherical-surface shape, the first dome portion including a first top portion and a first bottom end portion forming a first opening, the first bottom end portion having an inside diameter larger than an outside diameter of the first end; a third forming step of forming a second dome portion made of fiber reinforced resin and having a hemispherical-surface shape, the second dome portion including a second top portion and a second bottom end portion forming a second opening, the second bottom end portion having an inside diameter larger than an outside diameter of the second end; a first placing step of placing the first end inside the first dome portion by moving, in the axial direction, at least either of the first dome portion and the pipe portion until the first bottom end portion abuts with the first stepped portion; a second placing step of placing the second end inside the second dome portion by moving, in the axial direction, at least either of the second dome portion and the pipe portion; a first joining step of, after the first placing step, joining the pipe portion to the first dome portion; and a second joining step of, after the second placing step, joining the pipe portion to the second dome portion. With this aspect, the first dome portion can be positioned relative to the pipe portion by use of the first stepped portion formed in advance. Accordingly, the accuracy of the length of the reinforced layer in the axial direction can be improved.

(2) In the manufacturing method according to the above aspect, the first forming step may include a winding step of winding a fiber around a mandrel in hoop winding. The first stepped portion may be formed in the first end portion such that the number of winding on the second end side of the first end portion is made larger than the number of winding on the first end side of the first end portion. With this aspect, the first stepped portion can be formed by increasing the number of winding in hoop winding.

(3) In the manufacturing method according to the above aspect, the first forming step may include a step of forming a second stepped portion in the second end portion such that the second stepped portion projects outwardly at a position distanced from the second end in the axial direction by a second distance determined in advance. The second placing step may include a step of moving, in the axial direction, at least either of the second dome portion and the pipe portion until the second bottom end portion abuts with the second stepped portion. With this aspect, the second dome portion can be positioned relative to the pipe portion by use of the second stepped portion formed in advance. Accordingly, the accuracy of the length of the reinforced layer in the axial direction can be improved.

(4) The manufacturing method according to the above aspect may further include a fourth forming step of, after the first joining step and the second joining step, forming a helical layer by providing fibers over the first dome portion and the second dome portion. With this aspect, the strength of the reinforced layer can be improved by the helical layer. Further, a gap to be formed between the helical layer and the outer surface of the pipe portion is reduced by the first stepped portion. Accordingly, it is possible to reduce occurrence of cavities in which the helical layer is not formed, thereby making it possible to restrain a decrease in the strength of the reinforced layer.

Note that this disclosure can be achieved in various aspects such as an aspect of a reinforced layer for a high-pressure tank and an aspect of a high-pressure tank including the reinforced layer in addition to the above aspects.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
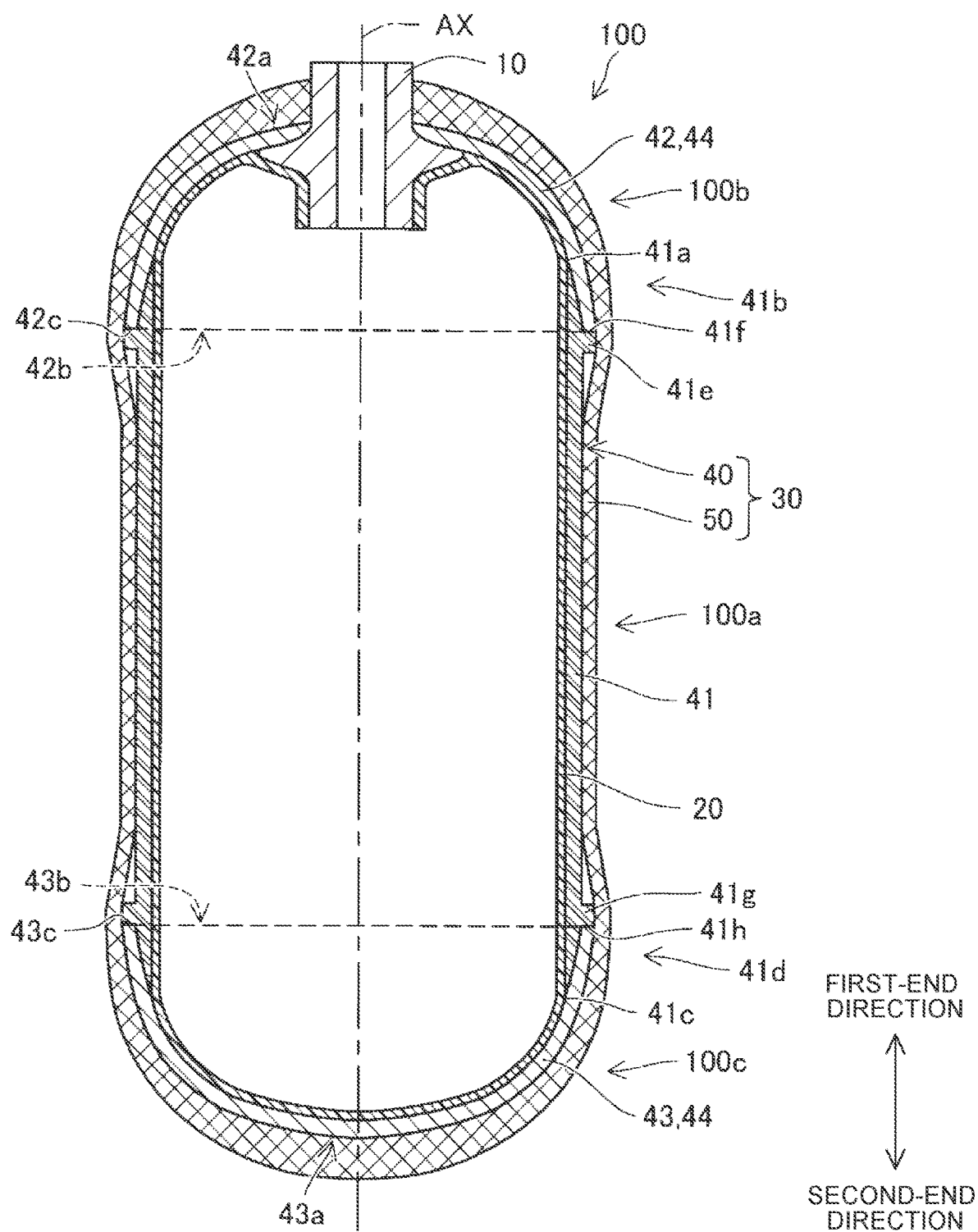
FIG. 1 is a sectional view illustrating a schematic configuration of a high-pressure tank.

FIG. 1 is a sectional view illustrating a schematic configuration of a high-pressure tank 100. The high-pressure tank 100 is provided in a fuel cell vehicle, for example, and is used to store a fuel gas to be supplied to a fuel cell. In the following description, a direction along a central axis AX of the high-pressure tank 100 is referred to as an "axial direction."

The high-pressure tank 100 includes a mouth piece 10, a liner 20, and a reinforced layer 30. Respective central axes of the mouth piece 10, the liner 20, and the reinforced layer 30 are the same as the central axis AX of the high-pressure tank 100. The high-pressure tank 100 includes a cylindrical portion 100a, a first tank end portion 100b, and a second tank end portion 100c. The cylindrical portion 100a has a generally cylindrical shape. The first tank end portion 100b and the second tank end portion 100c are provided on the opposite ends of the cylindrical portion 100a, respectively, and have respective shapes reduced in diameter toward respective end portions in the axial direction. The first tank end portion 100b is opened, and the mouth piece 10 is attached to the opening.

The liner 20 is a hollow container having a gas barrier property and made of resin such as polyamide, for example. The material of the liner 20 is not limited to polyamide and may be other thermoplastic resins such as polyethylene, ethylene-vinyl alcohol copolymer resin (EVOH), and polyester or thermosetting resins such as epoxy, for example. The mouth piece 10 is made of metal such as aluminum, for example. The mouth piece 10 has a generally cylindrical shape so that an internal space of the liner 20 communicates with its outside. In a case where the high-pressure tank 100 is provided in a fuel cell vehicle, for example, a valve (not shown) is attached to the mouth piece 10.

The reinforced layer 30 is formed on the outer periphery of the liner 20. The reinforced layer 30 includes a joined body 40 and a helical layer 50. The joined body 40 and the helical layer 50 are made of fiber reinforced resin such as carbon fiber reinforced plastics (CFRP), for example.

The joined body 40 includes a pipe portion 41, a first dome portion 42, and a second dome portion 43. The pipe portion 41 has a generally cylindrical shape extending in the axial direction and is placed in the cylindrical portion 100a. The pipe portion 41 includes a first end portion 41b including a first end 41a in the axial direction and a second end portion 41d including a second end 41c in the axial direction. The first end portion 41b includes a projecting portion 41e provided at a position distanced from the first end 41a in the axial direction and projecting outwardly. Since the first end portion 41b includes the projecting portion 41e, a first stepped portion 41f is formed in the first end portion 41b such that the first stepped portion 41f projects outwardly at a position distanced from the first end 41a in the axial direction by a first distance determined in advance. Similarly, the second end portion 41d includes a projecting portion 41g provided at a position distanced from the second end 41c in the axial direction and projecting outwardly. Since the second end portion 41d includes the projecting portion 41g, a second stepped portion 41h is formed such that the second stepped portion 41h projects outwardly at a position distanced from the second end 41c in the axial direction by a second distance determined in advance. In the present embodiment, the first distance and the second distance are set to the same distance, but they may be different from each other.

The first dome portion 42 and the second dome portion 43 have respective hemispherical-surface shapes reduced in diameter toward respective end portions in the axial direction. The first dome portion 42 and the second dome portion 43 are placed in the first tank end portion 100b and the second tank end portion 100c, respectively. The first dome portion 42 and the second dome portion 43 are opened toward the center of the high-pressure tank 100 in the axial direction. The first dome portion 42 includes a first top portion 42a and a first bottom end portion 42c forming a first opening 42b. The first bottom end portion 42c forms a bottom portion of the first dome portion 42 having a hemispherical-surface shape. The first top portion 42a faces the first opening 42b in the axial direction. The inside diameter of the first bottom end portion 42c is larger than the outer diameter of the first end 41a. The second dome portion 43 includes a second top portion 43a and a second bottom end portion 43c forming a second opening 43b. The second bottom end portion 43c forms a bottom portion of the second dome portion 43 having a hemispherical-surface shape. The second top portion 43a faces the second opening 43b in the axial direction. The inside diameter of the second bottom end portion 43c is larger than the outer diameter of the second end 41c. The pipe portion 41, the first dome portion 42, and the second dome portion 43 are formed separately and then joined to each other. The first end 41a of the pipe portion 41 is placed inside the first dome portion 42, and the second end 41c of the pipe portion 41 is placed inside the second dome portion 43. The first end portion 41b, of the pipe portion 41, that is placed inside the first dome portion 42 is reduced in thickness toward the first end 41a along a curved surface of the first dome portion 42. Similarly, the second end portion 41d, of the pipe portion 41, that is placed inside the second dome portion 43 is reduced in thickness toward the second end 41c along a curved surface of the second dome portion 43. In the following description, the first dome portion 42 and the second dome portion 43 may be collectively referred to as a dome portion 44. The helical layer 50 is formed to cover the joined body 40.

Figure 2:
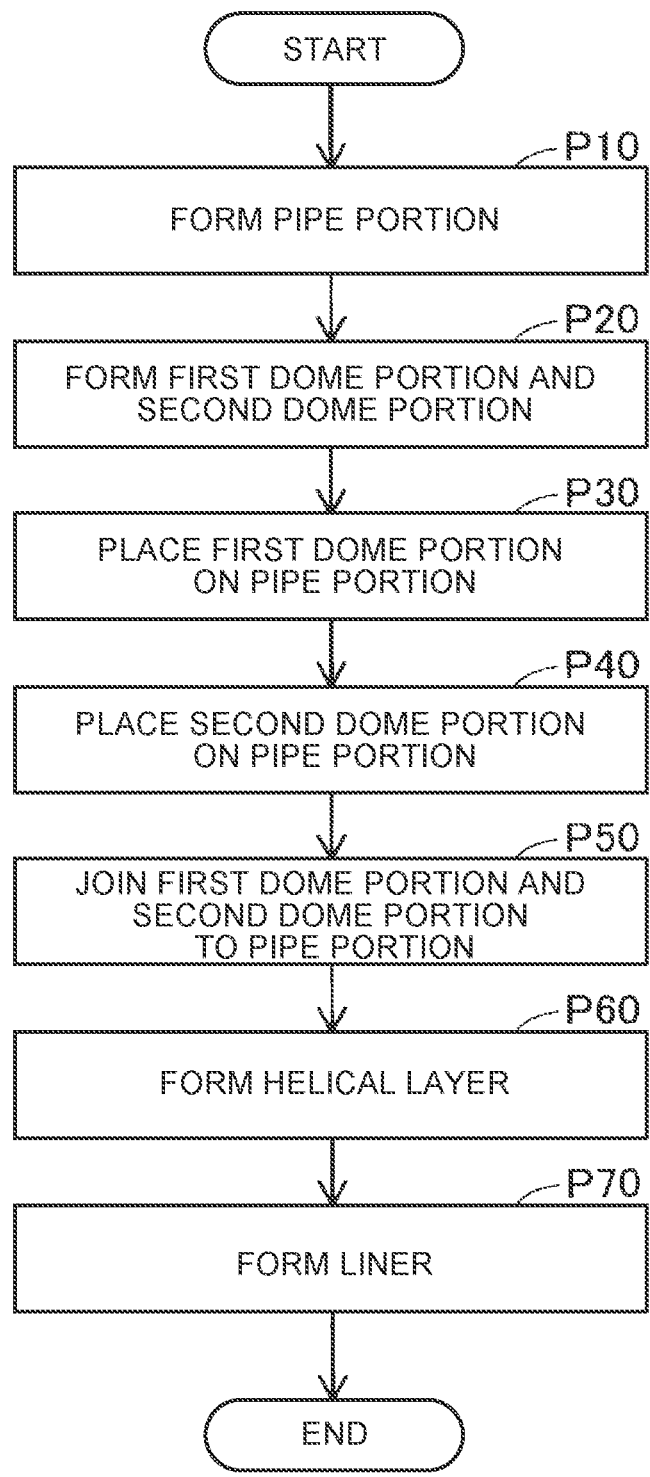
FIG. 2 is a view to describe a manufacturing process of the high-pressure tank.
Figure 3:
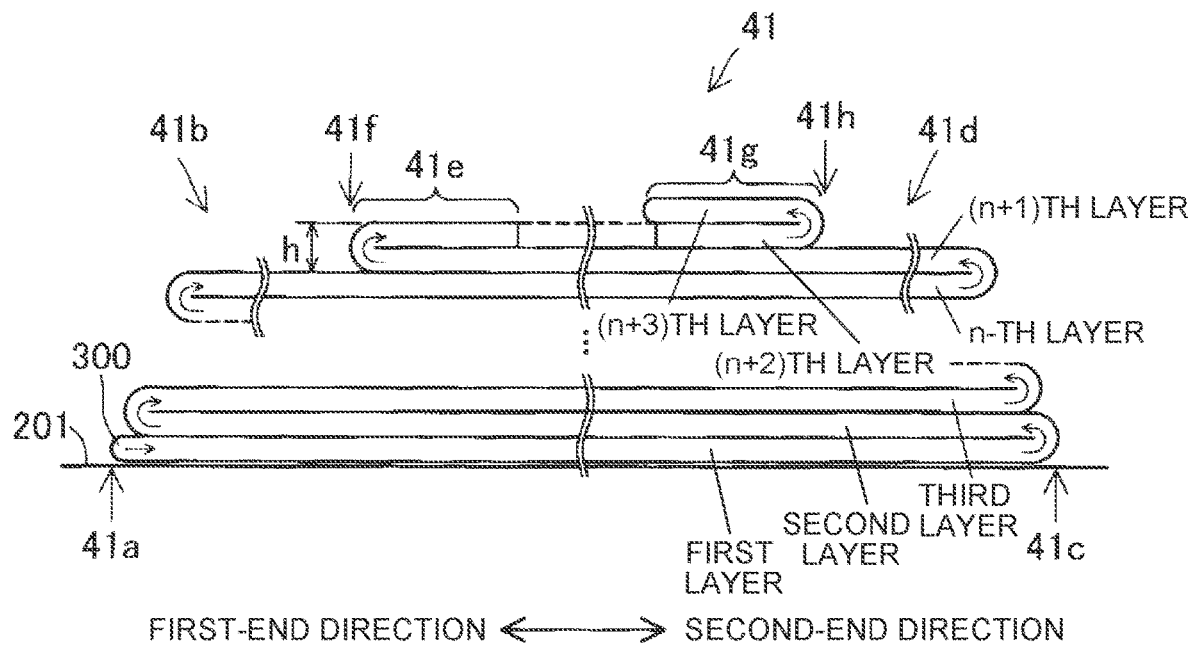
FIG. 3 is a schematic view illustrating a layered structure of a pipe portion.
Figure 4:
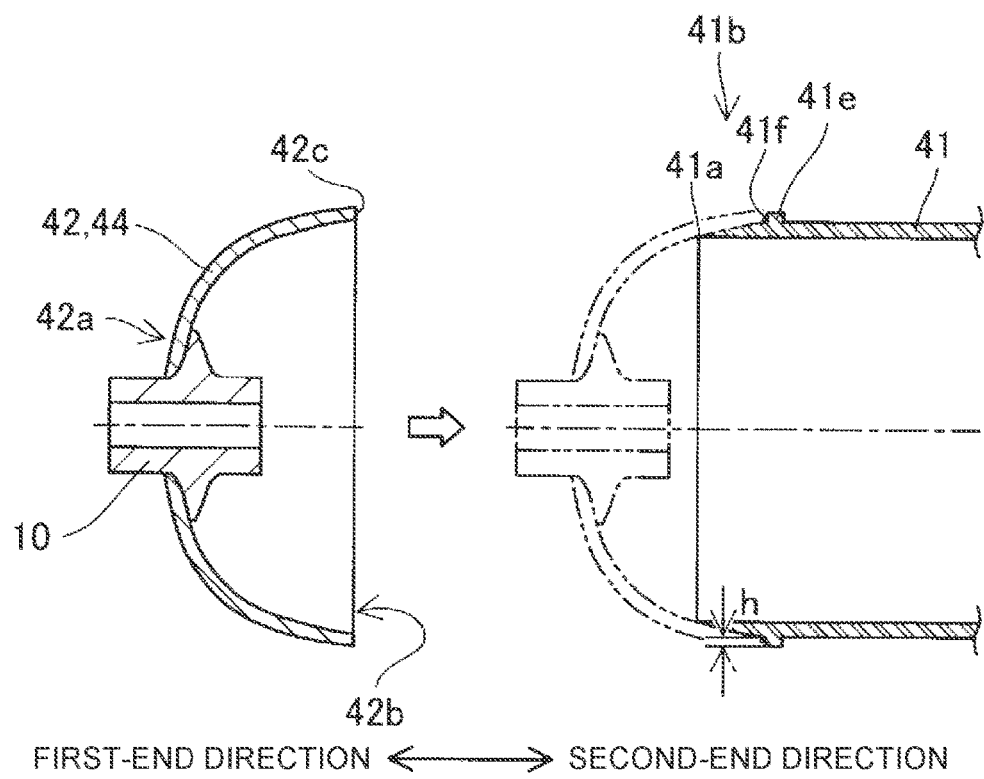
FIG. 4 is a view to describe a step of placing a first dome portion on the pipe portion.
Figure 5:
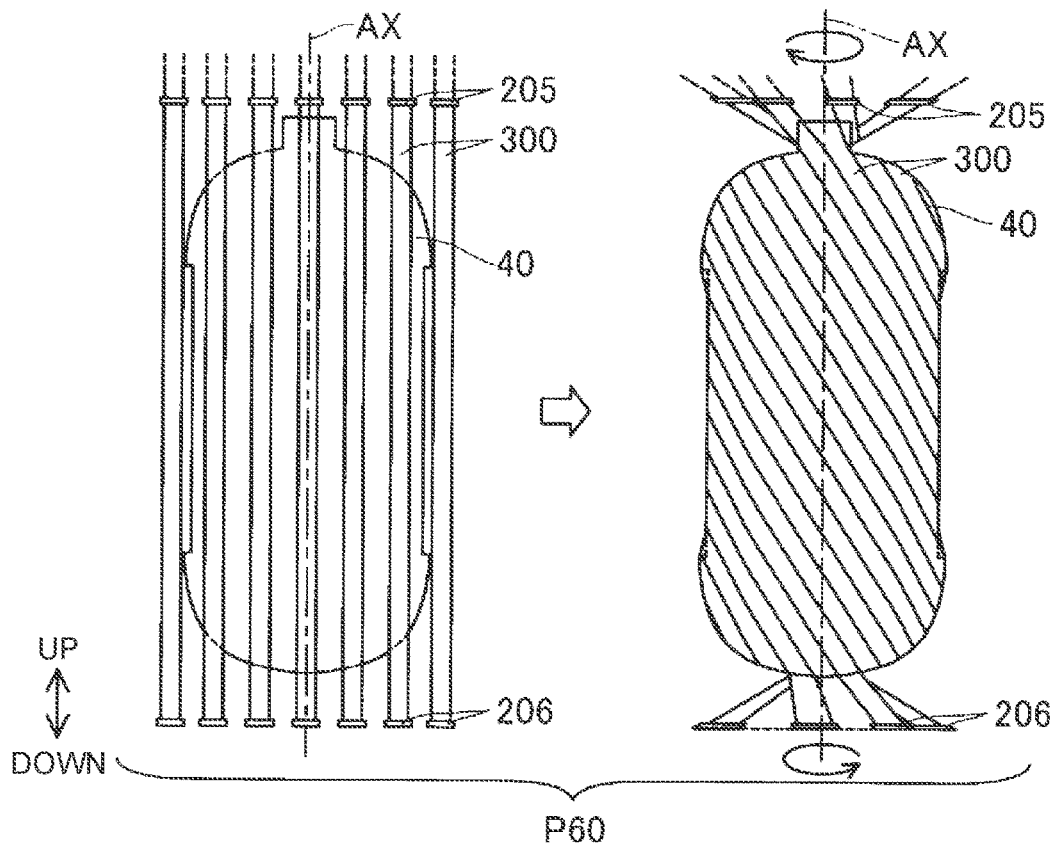
FIG. 5 is a view to describe a step of forming a helical layer.

With reference to FIGS. 2 to 5, the following describes a manufacturing method for manufacturing the high-pressure tank 100. FIG. 2 is a view to describe a manufacturing process of the high-pressure tank 100. FIG. 3 is a schematic view illustrating a layered structure of the pipe portion 41 formed in a winding step included in first forming step P10. FIG. 4 is a view to describe a step of placing the first dome portion 42 on the pipe portion 41. FIG. 5 is a view to describe a step of forming the helical layer 50. In first forming step P10 illustrated in FIG. 2, the pipe portion 41 is formed. First forming step P10 includes a winding step of winding a carbon fiber 300 impregnated with thermosetting resin such as epoxy resin, for example, around a mandrel 201 (FIG. 3) having a cylindrical shape by use of a filament winding method (hereinafter referred to as a FW method). In the following description, the "carbon fiber 300 impregnated with thermosetting resin" may be just referred to as a "fiber 300." Note that the thermosetting resin is not limited to epoxy resin and may be phenolic resin, melamine resin, urea resin, or the like. Further, the fiber material of the pipe portion 41 is not limited to carbon fiber and may be glass fiber, aramid fiber, boron fiber, or the like, for example.

As illustrated in FIG. 3, the fiber 300 is wound around the mandrel 201 such that the mandrel 201 rotates around its central axis while the mandrel 201 takes up the fiber 300 sent from a feeder (not shown). When the feeder moves to a first-end direction or to a second-end direction, the position where the fiber 300 is wound in the mandrel 201 is adjusted. The fiber 300 is wound in hoop winding in which the angle of the fiber 300 to the central axis of the mandrel 201 is generally 90 degrees. The first stepped portion 41f is formed in the first end portion 41b such that the number of winding on the second end 41c side is made larger than the number of winding on the first end 41a side. Similarly, the second stepped portion 41h is formed in the second end portion 41d such that the number of winding on the first end 41a side is made larger than the number of winding on the second end 41c side.

The winding of the fiber 300 is started from the first end 41a of the pipe portion 41 toward the second-end direction until the winding reaches the second end 41c, for example. Hereby, a first layer is formed. When the winding is finished at the second end 41c, the moving direction of the feeder is turned back, and a second layer is wound toward the first-end direction. After the second layer, the moving of the feeder in the axial direction and the turning-back of the moving direction are repeated similarly to the first layer, so that a plurality of fiber layers is formed. Here, the turning position of an upper layer is placed to be closer to the central side in the axial direction than the turning position of a lower layer. As a result, a tapered shape in which the thickness of the pipe portion 41 is made thinner toward its end portions in the axial direction is formed. A (n+1)th layer and its subsequent layers are layers to form the projecting portion 41e and the projecting portion 41g. The (n+1)th layer is turned back at the forming position of the first stepped portion 41f, and winding is performed only by the width of the projecting portion 41e. After that, the fiber 300 is wound to an end portion, of the projecting portion 41g, that is opposite to the second stepped portion 41h in a state where an orientation angle as the angle of the fiber 300 relative to the central axis of the mandrel 201 is made small. After that, the fiber 300 is wound in hoop winding only by the width of the projecting portion 41g toward the second-end direction until the fiber 300 reaches the position of the second stepped portion 41h, and then, the fiber 300 is turned back and wound only by the width of the projecting portion 41g. Here, the winding step ends.

In the present embodiment, the projecting portion 41e is formed by two layers of the fiber 300, so that a height h of the first stepped portion 41f is about two times the thickness of the fiber 300. The thickness of one layer is, for example, about not less than 0.2 mm but not more than 0.5 mm, and the height h is, for example, about not less than 0.4 mm but not more than 1 mm. As will be described later, the height h of the first stepped portion 41f is adjusted in accordance with a distance between an inner peripheral surface of the first dome portion 42 and an outer peripheral surface of the first end portion 41b, or the like in a state where the first dome portion 42 is placed on the pipe portion 41. The number of layers of the fiber 300 constituting the projecting portion 41e is adjusted in accordance with the height h of the first stepped portion 41f. The same can be said about the second stepped portion 41h.

After the winding step ends, the thermosetting resin with which the fiber 300 is impregnated is hardened. Generally, the viscosity of thermosetting resin decreases temporarily when the thermosetting resin is heated, and after that, the viscosity increases gradually. When the viscosity reaches its maximum viscosity, the viscosity hardly changes even when the heating is continued. The inventors found the following facts. That is, by keeping heating thermosetting resin even after the viscosity of the thermosetting resin reaches its maximum viscosity, physical properties of the thermosetting resin such as the Young's modulus become stable, for example. Here, to harden thermosetting resin by heating the thermosetting resin until physical properties of the thermosetting resin become stable is referred to as "main hardening," and to harden the thermosetting resin by heating the thermosetting resin for a shorter time period than the "main hardening" is referred to as "pre-hardening." The step of hardening the thermosetting resin may be pre-hardening or may be main hardening. After the thermosetting resin hardens, the pipe portion 41 is detached from the mandrel 201. Thus, the pipe portion 41 is formed.

In step P20 (FIG. 2) as a second forming step and a third forming step, the first dome portion 42 and the second dome portion 43 are formed by the FW method by use of a fiber similar to the fiber 300 used to form the pipe portion 41. Materials of the fiber used to form the first dome portion 42 and the second dome portion 43 and resin with which the fiber is impregnated may be the same as the materials used to form the pipe portion 41 or may be different from the materials used to form the pipe portion 41. In the formation, the first mouth piece 10 is first attached to a mandrel formed generally in a shape to be obtained when the first dome portion 42 and the second dome portion 43 are joined to each other in the axial direction. Then, the fiber is wound around the mandrel rotating around the axial direction, so that a formed body generally in a shape to be obtained when the first dome portion 42 and the second dome portion 43 are joined to each other in the axial direction is formed. Subsequently, the formed body is heated, so that thermosetting resin with which the fiber is impregnated is hardened. This hardening step may be pre-hardening or may be main hardening. Subsequently, the formed body is cut along its circumferential direction, so that the first dome portion 42 and the second dome portion 43 are formed. The orientation angle of the fiber to the axial direction of the mandrel is, for example, 40 degrees. By inserting the hardening step before the formed body is cut, the formed body can be cut easily.

In first placing step P30, the first dome portion 42 is placed on the pipe portion 41. More specifically, as illustrated in FIG. 4, the first dome portion 42 is moved to the pipe portion 41 in the axial direction until the first bottom end portion 42c of the first dome portion 42 abuts with the first stepped portion 41f of the pipe portion 41. Hereby, the first end 41a of the pipe portion 41 is placed inside the first dome portion 42 via the first opening 42b. Note that first placing step P30 is not limited to the step in which the first dome portion 42 is moved to the fixed pipe portion 41. The pipe portion 41 may be moved to the fixed first dome portion 42, or the first dome portion 42 and the pipe portion 41 may be both moved to approach each other. The joined body 40 is formed by combining the pipe portion 41, the first dome portion 42, and the second dome portion 43 that are formed separately. On this account, when the positional accuracy of the first dome portion 42 relative to the pipe portion 41 and the positional accuracy of the second dome portion 43 relative to the pipe portion 41 are low, the accuracy of the overall length that is the length of the high-pressure tank 100 in the axial direction decreases. In the present embodiment, the first stepped portion 41f is formed in the first end portion 41b of the pipe portion 41 such that the first stepped portion 41$f$ is placed at a position distanced from the first end 41$a$ by a first distance determined in advance. Here, the first distance determined in advance is a distance determined in advance so that the overall length of the high-pressure tank 100 as a finished-product achieves a target length. Accordingly, when the first dome portion 42 is placed on the pipe portion 41 such that the first bottom end portion 42$c$ abuts with the first stepped portion 41$f$ of the pipe portion 41, the positional accuracy of the first dome portion 42 relative to the pipe portion 41 can be improved. This makes it possible to improve the accuracy of the overall length of the high-pressure tank 100. Note that the first stepped portion 41$f$ is formed continuously in the circumferential direction of the pipe portion 41 without any cut line. On this account, when the whole area of the first stepped portion 41$f$ is brought into contact with the whole area of the first bottom end portion 42$c$ at the time when the first dome portion 42 is placed on the pipe portion 41, the first dome portion 42 and the pipe portion 41 can be placed such that their central axes are positioned generally on the same straight line. Thus, the first dome portion 42 can be placed uniformly in the circumferential direction.

The height h of the first stepped portion 41$f$ is preferably a height that allows the first bottom end portion 42$c$ of the first dome portion 42 to be caught on the projecting portion 41$e$ when the first dome portion 42 is moved to the pipe portion 41. In the present embodiment, in a state where the first dome portion 42 is placed on the pipe portion 41, the distance between the inner peripheral surface of the first dome portion 42 and the outer peripheral surface of the first end portion 41$b$ is about 0.4 mm at the maximum, and the height h of the first stepped portion 41$f$ is about 1 mm.

Further, the height h of the first stepped portion 41$f$ may be set to a height that can restrict the movement of the first dome portion 42 to the central side in the axial direction in fourth forming step P60 described below. In fourth forming step P60, as the fibers 300 provided over the first dome portion 42 and the second dome portion 43 are tightened, respective external forces are applied to the first dome portion 42 and the second dome portion 43 in directions where they approach each other. As a result, the first dome portion 42 deforms so that the first opening 42$b$ expands outwardly. In view of this, even in a case where the first opening 42$b$ expands outwardly, when the height h of the first stepped portion 41$f$ is high to such an extent that the movement of the dome portion 44 to the central side in the axial direction can be restricted, it is possible to restrain the high-pressure tank 100 from contracting in the axial direction. A deformation amount in the case where the first opening 42$b$ deforms to expand outwardly depends on the rigidity of the dome portion 44, the tensile force of the fibers 300, and so on. In view of this, in a case where the height h of the first stepped portion 41$f$ is set to a height that can restrict the movement of the first dome portion 42 to the central side in the axial direction in fourth forming step P60, the height h may be determined in accordance with the deformation amount of the first dome portion 42, the thickness of the dome portion 44, and so on.

In second placing step P40 (FIG. 2), the second dome portion 43 is placed on the pipe portion 41. More specifically, similarly to first placing step P30, the second dome portion 43 is moved to the pipe portion 41 in the axial direction until the second bottom end portion 43$c$ of the second dome portion 43 abuts with the second stepped portion 41$h$ of the pipe portion 41. Hereby, the second end 41$c$ of the pipe portion 41 is placed inside the second dome portion 43 via the second opening 43$b$. Note that second placing step P40 is not limited to the step in which the second dome portion 43 is moved to the fixed pipe portion 41. The pipe portion 41 may be moved to the fixed second dome portion 43, or the second dome portion 43 and the pipe portion 41 may be both moved to approach each other. The second stepped portion 41$h$ is formed in the second end portion 41$d$ of the pipe portion 41 such that the second stepped portion 41$h$ is placed at a position distanced from the second end 41$c$ by a second distance determined in advance so that the overall length of the high-pressure tank 100 as a finished-product achieves the target length. Accordingly, when the second dome portion 43 is moved until the second bottom end portion 43$c$ of the second dome portion 43 abuts with the second stepped portion 41$h$ of the pipe portion 41, the positional accuracy of the second dome portion 43 relative to the pipe portion 41 can be improved. This makes it possible to improve the accuracy of the overall length of the high-pressure tank 100. Note that the second stepped portion 41$h$ is formed continuously in the circumferential direction of the pipe portion 41 without any cut line. Accordingly, when the whole area of the second stepped portion 41$h$ is brought into contact with the whole area of the second bottom end portion 43$c$ at the time when the second dome portion 43 is placed on the pipe portion 41, the second dome portion 43 and the pipe portion 41 can be placed such that their central axes are positioned generally on the same straight line. Thus, the second dome portion 43 can be placed uniformly in the circumferential direction.

In step P50 as a first joining step and a second joining step, the pipe portion 41 is joined to the first dome portion 42, and the pipe portion 41 is joined to the second dome portion 43. More specifically, the pipe portion 41 is bonded to the first dome portion 42 and the second dome portion 43 such that an adhesive such as epoxy resin is applied between the outer peripheral surface of the pipe portion 41 and each of the inner peripheral surfaces of the first dome portion 42 and the second dome portion 43, for example. Hereby, the joined body 40 is formed. Note that the resin used for the first dome portion 42 and the second dome portion 43 may be used as the adhesive, but adhesives made of different materials may be also usable.

Note that the step in which the pipe portion 41 is joined to the first dome portion 42 and the second dome portion 43 is not limited to step P50. For example, a step of joining the pipe portion 41 to the first dome portion 42 may be provided after first placing step P30, and a step of joining the pipe portion 41 to the second dome portion 43 may be provided after second placing step P40.

In fourth forming step P60, the helical layer 50 is formed on the outer peripheral surface of the joined body 40 by use of a fiber similar to the fiber 300 used to form the pipe portion 41. Materials of the fiber used to form the helical layer 50 and resin with which the fiber is impregnated may be the same as the materials used to form the pipe portion 41 or may be different from the materials used to form the pipe portion 41. As illustrated on the left side in FIG. 5, the joined body 40 is placed such that its axial direction is along the vertical direction, for example. A plurality of unwinding portions 205 is placed at regular intervals in the circumferential direction near an upper end portion of the joined body 40 such that the unwinding portions 205 surround the joined body 40. The unwinding portions 205 send the fibers 300 toward the lower side. Respective holding members 206 are attached to respective end portions of the fibers 300. The unwinding portions 205 send the fibers 300 until the holding members 206 are placed below the joined body 40. Subsequently, as illustrated on the right side in FIG. 5, the unwinding portions 205 and the holding members 206 are rotated around the central axis AX. Here, the rotation direction of the unwinding portions 205 is reverse to the rotation direction of the holding members 206. For example, in a case where the unwinding portions 205 are rotated clockwise when they are viewed from above, the holding members 206 are rotated counterclockwise. Hereby, the fibers 300 are twisted. As the rotations advance, the fibers 300 come closer to the outer periphery of the joined body 40 so that the fibers 300 are placed along the outer periphery of the joined body 40 without any gap. The orientation angle that is the angle of the fibers 300 relative to the central axis AX is within a range larger than zero degrees but not larger than 45 degrees and is, for example, 20 degrees or less. The movement of the fibers 300 is restricted by adhesive strength of the resin. After that, excess parts, of the fibers 300, that do not cover the joined body 40 are cut, and hereby, a first layer of the helical layer 50 is formed.

A second layer is formed on the first layer in a similar manner. Note that the rotation direction of the unwinding portions 205 in the second layer is reverse to the rotation direction in the first layer. Similarly, the rotation direction of the holding members 206 in the second layer is reverse to the rotation direction in the first layer. Hereby, the fibers 300 in the second layer are oriented in a direction intersecting with the orientation direction of the fibers 300 in the first layer. Note that the number of layers in the helical layer 50 is not limited to two and may be any even number that is four or more. When the formation of the helical layer 50 is finished, the joined body 40 on which the helical layer 50 is formed is subjected to main hardening, and thus, the reinforced layer 30 is finished. The formation of the helical layer 50 can improve the strength of the reinforced layer 30 against internal pressure applied in directions where the first dome portion 42 and the second dome portion 43 are separated from each other when the high-pressure tank 100 is filled with high-pressure gas.

In fourth forming step P60, the fibers 300 are provided over the first dome portion 42 and the second dome portion 43 at a small orientation angle. On this account, as illustrated in FIG. 1, the helical layer 50 is formed generally along the outer surface of the joined body 40. However, since the dome portion 44 is placed on the outer side of the pipe portion 41 in an overlapping manner, a step is formed in a boundary portion where the outer surface of the joined body 40 is shifted from the dome portion 44 to the pipe portion 41, thereby resulting in that a gap is formed between the helical layer 50 and the outer surface of the pipe portion 41. Here, the projecting portion 41e and the projecting portion 41g are provided so as to abut with the first bottom end portion 42c and second bottom end portion 43c, respectively. On this account, gaps formed between the helical layer 50 and the outer surface of the pipe portion 41 are reduced by the projecting portion 41e and the projecting portion 41g. As such, since the projecting portion 41e and the projecting portion 41g are provided, it is possible to reduce occurrence of cavities in which the helical layer 50 is not formed, thereby making it possible to restrain a decrease in the strength of the reinforced layer 30.

In step P70 (see FIG. 2), the liner 20 is formed on the inner surface of the reinforced layer 30. More specifically, a resin material to form the liner 20 is injected into the inside of the reinforced layer 30 from the opening of the mouth piece 10, and the reinforced layer 30 is rotated. Due to the rotation, the resin material is attached to the inner surface of the reinforced layer 30 so as to cover the inner surface. When the resin material is solidified, the liner 20 is formed, and thus, the high-pressure tank 100 is finished. In a case where the liner 20 is made of thermoplastic resin, the thermoplastic resin is solidified by cooling, and in a case where the liner 20 is made of thermosetting resin, the thermosetting resin is solidified by heating. The resin material is resin heated to have a low viscosity, for example. Further, the resin material may include two or more types of resin materials that produce resin by reaction. In this case, like reaction injection molding, the liner 20 may be formed by the following method. For example, in a case where the liner 20 is made of polyamide, first, two or more types of liquid resin materials having a low molecular weight and a low viscosity and configured to produce polyamide by reaction are injected into the inside of the reinforced layer 30 while the liquid resin materials are mixed. The resin materials thus mixed are attached to the inner surface of the reinforced layer 30 that is rotating and form high-molecular polyamide by reaction. After that, the internal space of the reinforced layer 30 is cooled, so that the polyamide is solidified.

In the high-pressure tank 100 manufactured by the manufacturing process described above, the liner 20 can be made thin in comparison with a high-pressure tank in which a reinforced layer is formed by winding a fiber around a liner by the FW method. This is because a step of winding the fiber 300 around the liner 20 is not provided, and therefore, it is possible to restrain the strength of the liner to be low. Further, the used amount of fiber reinforced resin used for the reinforced layer can be reduced as compared with the high-pressure tank manufactured by winding the fiber around the liner. In the manufacturing method in which the fiber is wound around the liner, the strength of a pipe portion is secured mainly by a fiber layer wound in hoop winding, and the strength of a dome portion is secured mainly by a fiber layer wound in helical winding so as to be provided over the dome portion. Here, the fiber layer formed in helical winding is also formed on the pipe portion 41, and therefore, the amount of the fiber reinforced resin to be used is larger than the used amount of the fiber reinforced resin necessary to secure the strength of the pipe portion. In contrast, in the present embodiment, since the dome portion 44 and the pipe portion 41 are formed separately, it is not necessary to use more fiber reinforced resin than a necessary used amount to secure a target strength in the formation of the pipe portion. Accordingly, with the manufacturing method according to the present embodiment, the used amount of the fiber reinforced resin used for the reinforced layer can be reduced as compared with the high-pressure tank manufactured by winding the fiber around the liner.

In the first embodiment described above, in first forming step P10, the pipe portion 41 is formed to include the first stepped portion 41f projecting outwardly at the position distanced from the first end 41a in the axial direction by the first distance determined in advance. Further, in first placing step P30, the first dome portion 42 is moved to the pipe portion 41 in the axial direction until the first bottom end portion 42c of the first dome portion 42 abuts with the first stepped portion 41f of the pipe portion 41. After that, in step P50, the pipe portion 41 is joined to the first dome portion 42. Since the first dome portion 42 can be positioned relative to the pipe portion 41 by use of the first stepped portion 41f formed in advance, the accuracy of the overall length of the reinforced layer 30 can be improved.

Further, in the winding step in first forming step P10, the pipe portion 41 is formed by winding the fiber 300 around the mandrel 201 in hoop winding, and the first stepped portion 41f is formed in the first end portion 41b such that the number of winding on the second end 41c side is made larger than the number of winding on the first end 41a side. Hereby, the first stepped portion 41f can be formed by increasing the number of winding in hoop winding.

Further, in first forming step P10, the pipe portion 41 is formed to include the second stepped portion 41h projecting outwardly at the position distanced from the second end 41c in the axial direction by the second distance determined in advance. Further, in second placing step P40, the second dome portion 43 is moved to the pipe portion 41 in the axial direction until the second bottom end portion 43c of the second dome portion 43 abuts with the second stepped portion 41h of the pipe portion 41. After that, in step P50, the pipe portion 41 is joined to the second dome portion 43. Since the second dome portion 43 can be positioned relative to the pipe portion 41 by use of the second stepped portion 41h formed in advance, the accuracy of the overall length of the reinforced layer 30 can be improved.

Further, in fourth forming step P60, the helical layer 50 is formed on the outer peripheral surface of the joined body 40. By forming the helical layer 50, the strength of the reinforced layer 30 can be improved. Here, since the first stepped portion 41f and the second stepped portion 41h are provided, gaps to be formed between the helical layer 50 and the outer surface of the pipe portion 41 are reduced. Accordingly, it is possible to reduce occurrence of cavities in which the helical layer 50 is not formed, thereby making it possible to restrain a decrease in the strength of the reinforced layer 30.

B. Second Embodiment

Figure 6:
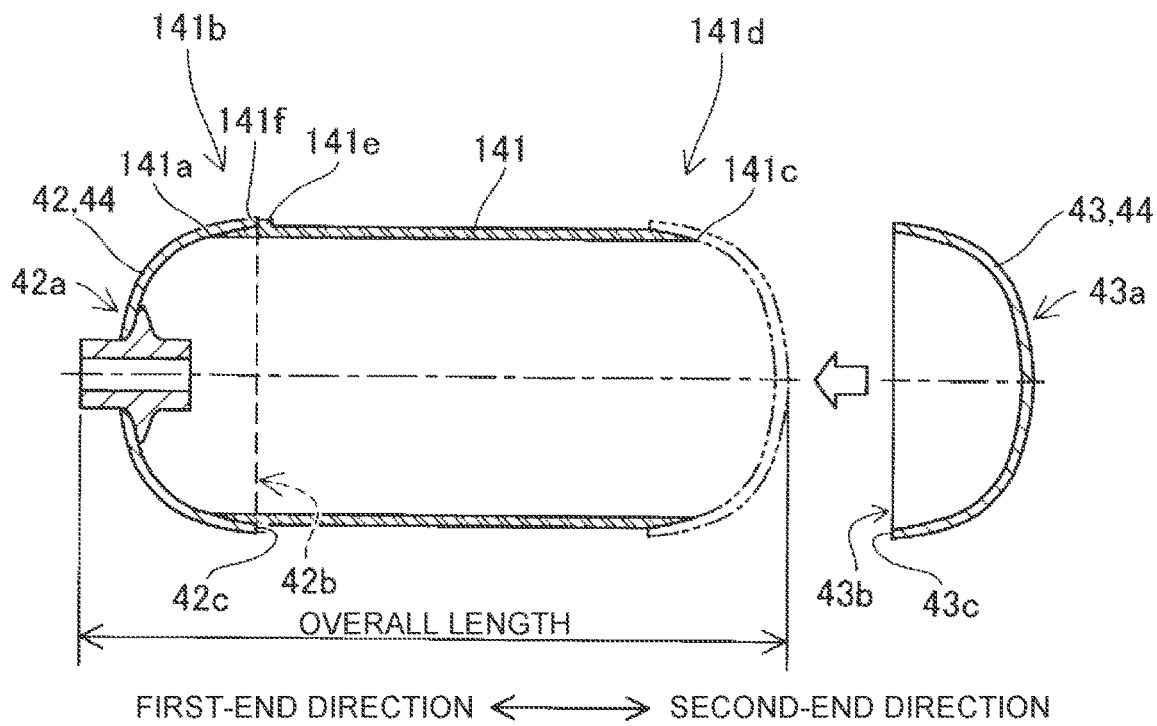
FIG. 6 is a view to describe a step of placing a second dome portion on a pipe portion according to a second embodiment.

The following describes a high-pressure tank according to the second embodiment with reference to FIG. 6. A pipe portion 141 included in the high-pressure tank according to the second embodiment is different from the pipe portion 41 according to the first embodiment in that a stepped portion is not formed on a second-end direction side. The pipe portion 141 includes a first end portion 141b including a first end 141a in the axial direction, and a second end portion 141d including a second end 141c in the axial direction. The first end portion 141b includes a projecting portion 141e, so that a first stepped portion 141f is formed such that the first stepped portion 141f projects outwardly at a position distanced from the first end 141a in the axial direction by a first distance determined in advance. Constituents other than the pipe portion 141 are similar to those in the first embodiment, and therefore, the similar constituents are described with the use of the same reference signs as those used in the first embodiment.

The high-pressure tank according to the second embodiment is manufactured in a procedure similar to that in the first embodiment, though the contents of the steps are different from those in the first embodiment. Accordingly, a manufacturing method of the high-pressure tank in the second embodiment will be described with reference to FIG. 2. In first forming step P10, the pipe portion 141 is formed. More specifically, in the winding step described in the first embodiment, the pipe portion 141 in which the projecting portion 141e is formed is formed by omitting winding to form the projecting portion 41g in the first embodiment. In step P20, the first dome portion 42 and the second dome portion 43 are formed similarly to the first embodiment. In first placing step P30, the first dome portion 42 is placed on the pipe portion 141 similarly to the first embodiment. In second placing step P40, the second dome portion 43 is placed on the pipe portion 141. In the present embodiment, as illustrated in FIG. 6, the second dome portion 43 is positioned relative to the pipe portion 141 by use of a jig or the like, for example, so that the overall length that is the length from an end portion of the mouth piece 10 to an end portion of the second dome portion 43 achieves a length determined in advance. Hereby, even in a case where there is a difference between an axial length from the end portion of the mouth piece 10 to an end portion of the pipe portion 141 and its target length in a state where the mouth piece 10, the first dome portion 42, and the pipe portion 141 are joined to each other, the overall length of the high-pressure tank can be adjusted to its target overall length by adjusting the position of the second dome portion 43 relative to the pipe portion 141.

Step P50, fourth forming step P60, and step P70 are similar to those in the first embodiment, and therefore, descriptions thereof are omitted. Note that, similarly to the first embodiment, since the projecting portion 141e is provided, it is possible to reduce occurrence of cavities in which the helical layer 50 is not formed, thereby making it possible to restrain a decrease in the strength of the reinforced layer 30. On the other hand, since the projecting portion is not formed on the second end 141c side of the pipe portion 141, the strength of the reinforced layer 30 may decrease due to cavities in which the helical layer 50 is not formed, as compared with a case where the projecting portion is formed. In the present embodiment, the projecting portion 141e that can reduce occurrence of cavities is formed on the first end 141a side where the first dome portion 42 is placed, the first dome portion 42 having a strength lower than that of the second dome portion 43 due to the opening to which the mouth piece 10 is attached. This makes it possible to avoid such a situation that the strength of the reinforced layer 30 is excessively lowered on the side where the first dome portion 42 is placed as compared to the side where the second dome portion 43 is placed.

In the second embodiment described above, in second placing step P40, the second dome portion 43 is positioned relative to the pipe portion 141 so that the overall length that is the length from the end portion of the mouth piece 10 to the end portion of the second dome portion 43 achieves a length determined in advance. This makes it possible to improve the accuracy of the overall length of the high-pressure tank.

C. Other Embodiments (C1) In the first embodiment, the first stepped portion 41f and the second stepped portion 41h are formed by forming the projecting portion 41e and the projecting portion 41g. In this respect, the first stepped portion 41f and the second stepped portion 41h may be formed such that the thickness of a part of the pipe portion 41 from the first stepped portion 41f to the second stepped portion 41h is made generally uniform and is made thicker than the thickness of a part of the pipe portion 41 on the first end 41a side from the first stepped portion 41f and the thickness of a part of the pipe portion 41 on the second end 41c side from the second stepped portion 41h. Even in the case of the first stepped portion 41f and the second stepped portion 41h formed as such, the first dome portion 42 and the second dome portion 43 can be positioned relative to the pipe portion 41 by use of the first stepped portion 41f and the second stepped portion 41h, respectively. Accordingly, the accuracy of the overall length of the reinforced layer 30 can be improved. Further, since a step is hardly formed in the boundary portion where the outer surface of the joined body 40 is shifted from the dome portion 44 to the pipe portion 41, it is possible to reduce occurrence of cavities in which the helical layer 50 is not formed, thereby making it possible to restrain a decrease in the strength of the reinforced layer 30.

(C2) In the above embodiments, the pipe portion 41 is formed by use of the FW method in first forming step P10. In this respect, the pipe portion 41 may be formed such that two toric formed bodies formed separately and corresponding to the projecting portion 41*e* and the projecting portion 41*g*, respectively, are attached and joined to a cylindrical formed body formed by use of a centrifugal winding (CW) method. The CW method is a method in which a fiber sheet is placed inside a cylindrical mold, and the fiber sheet is stuck to the inside of the mold by centrifugal force generated by rotation of the mold, so that the fiber sheet is molded in a cylindrical shape. As the fiber sheet, a sheet into which a plurality of fiber bundles arranged unidirectionally is woven with restraint threads can be used, for example. Further, a fiber sheet impregnated with resin in advance before molding may be used, or after a fiber sheet is molded in a cylindrical shape, the fiber sheet may be impregnated with resin. The two toric formed bodies corresponding to the projecting portion 41*e* and the projecting portion 41*g* can be formed by use of the FW method, for example.

(C3) In the first embodiment, in first forming step P10, the resin is hardened after the winding of the fiber 300 is finished but before the pipe portion 41 is detached from the mandrel 201. The step where the resin constituting the pipe portion 41 is hardened is not limited to this timing. For example, the resin may be hardened (a) after the pipe portion 41 is detached from the mandrel 201 but before the pipe portion 41 is joined to the dome portion 44, (b) after the pipe portion 41 is joined to the dome portion 44 but before an adhesive is applied, (c) after the joined body is formed but before the helical layer 50 is formed, or (d) after the helical layer 50 is formed but before the liner 20 is formed.

(C4) In the first embodiment, in step P20, the first dome portion 42 is formed by winding the fiber around the mandrel to which the mouth piece 10 is attached in advance. In this respect, the first dome portion 42 may be formed such that, after the formed body is formed by winding the fiber around a mandrel to which the mouth piece 10 is not attached, the mouth piece 10 is attached to the formed body.

(C5) In the first embodiment, in step P20, the resin is hardened after the winding of the fiber 300 is finished but before the formed body is cut. The step where the resin constituting the dome portion 44 is hardened is not limited to this timing. For example, the resin may be hardened (a) after the formed body is cut but before the dome portion 44 is detached from the mandrel, (b) after the dome portion 44 is detached from the mandrel but before the dome portion 44 is joined to the pipe portion 41, (c) after the dome portion 44 is joined to the pipe portion 41 but before an adhesive is applied, (d) after the joined body is formed but before the helical layer 50 is formed, or (e) after the helical layer 50 is formed but before the liner 20 is formed.

(C6) In the first embodiment, in fourth forming step P60, the helical layer 50 is formed by twisting the fibers 300 arranged in the axial direction. In this respect, the helical layer 50 may be formed by use of the FW method.

(C7) In the first embodiment, in step P70, the liner 20 is formed such that the resin material of the liner 20 is injected into the inside of the reinforced layer 30 to cover the inner surface of the reinforced layer 30, and then the resin material is solidified. The formation method of the liner 20 is not limited to this. For example, the liner 20 may be formed separately from the pipe portion 41, the first dome portion 42, and the second dome portion 43, and the liner 20 may be combined with the pipe portion 41, the first dome portion 42, and the second dome portion 43. More specifically, the liner 20 may be inserted into the pipe portion 41, and after that, the first dome portion 42 and the second dome portion 43 may be attached to the pipe portion 41. In this method, the liner 20 may be formed by blow molding or injection molding.

(C8) In the high-pressure tank 100 according to each of the first embodiment and the second embodiment, the mouth piece 10 is attached only to the first end of the high-pressure tank 100 in the axial direction. In this respect, the high-pressure tank may be configured such that respective mouth pieces are attached to the opposite ends of the high-pressure tank in the axial direction. In this form, two mouth pieces attached to the opposite ends, respectively, may have different shapes such that one of the mouth pieces has a shape via which the internal space of the high-pressure tank does not communicate with its outside, for example. Further, in the high-pressure tank configured such that the mouth pieces are attached to the opposite ends of the high-pressure tank in the axial direction, fourth forming step P60 in the second embodiment should be performed in a state where the relative position of the mouth piece attached to the second dome portion 43 relative to the pipe portion 141 is fixed. As described above, in fourth forming step P60, respective external forces are applied, by the fibers 300 constituting the helical layer 50, to the first dome portion 42 and the second dome portion 43 in the directions where they approach each other. Since the stepped portion is not formed on the second end 141*c* side of the pipe portion 141, particularly the second dome portion 43 easily moves by the external force. In view of this, by fixing the mouth piece attached to the second dome portion 43, it is possible to restrain a positional deviation of the second dome portion 43 from the pipe portion 141.

(C9) In the second embodiment, the first dome portion 42 to which the mouth piece 10 is attached is placed on the first end 141*a* side where the first stepped portion 141*f* is formed. Alternatively, the second dome portion 43 to which the mouth piece 10 is not attached may be placed on the first end 141*a* side where the first stepped portion 141*f* is formed, and the first dome portion 42 to which the mouth piece 10 is attached may be placed on the second end 141*c* side. In this case, the second dome portion 43 to which the mouth piece 10 is not attached corresponds to a "first dome portion" described in SUMMARY, and the first dome portion 42 to which the mouth piece 10 is attached corresponds to a "second dome portion" described in SUMMARY.

(C10) In the first embodiment, step P20 is performed after first forming step P10. Further, second placing step P40 is performed after first placing step P30. The order of the steps is not limited to this, and first forming step P10 may be performed after step P20, or step P20 and first forming step P10 may be performed at the same time. Further, first placing step P30 may be performed after second placing step P40, or first placing step P30 and second placing step P40 may be performed at the same time.

(C11) In the first embodiment, the pipe portion 41 is formed in hoop winding by use of the FW method in first forming step P10. The winding method is not limited to hoop winding. The winding method may be helical winding with a small orientation angle, or hoop winding and helical winding may be used together.

(C12) In the first embodiment, the dome portion 44 is formed by use of the FW method in step P20. In this respect, the dome portion 44 may be formed by use of a tape placement method.

(C13) In the first embodiment, the winding of the fiber 300 is started from the first end 41*a* in first forming step P10. The winding start position is not limited to the first end 41*a* and may be the center of the pipe portion 41 in the axial direction, for example.

The disclosure is not limited to the above embodiments and is achievable in various configurations within a range that does not deviate from the gist of the disclosure. For example, technical features of the embodiments, corresponding to the technical features of the aspects described in SUMMARY, can be replaced or combined appropriately, in order to solve some or all of the problems described above or in order to achieve some or all of the above effects. Further, the technical features can be deleted appropriately if the technical features have not been described as essential in the present specification.

What is claimed is:

1. A manufacturing method for manufacturing a reinforced layer constituting a high-pressure tank, the manufacturing method comprising:
   a first forming step of forming a cylindrical pipe portion made of fiber reinforced resin and extending in an axial direction of the high-pressure tank, the pipe portion including a first end portion including a first end in the axial direction and a second end portion including a second end in the axial direction, the pipe portion being formed to have a first stepped portion formed in the first end portion such that the first stepped portion projects outwardly at a position distanced from the first end in the axial direction by a first distance determined in advance;
   a second forming step of forming a first dome portion made of fiber reinforced resin and having a hemispherical-surface shape, the first dome portion including a first top portion and a first bottom end portion forming a first opening, the first bottom end portion having an inside diameter larger than an outside diameter of the first end;
   a third forming step of forming a second dome portion made of fiber reinforced resin and having a hemispherical-surface shape, the second dome portion including a second top portion and a second bottom end portion forming a second opening, the second bottom end portion having an inside diameter larger than an outside diameter of the second end;
   a first placing step of placing the first end inside the first dome portion by moving, in the axial direction, at least either of the first dome portion and the pipe portion until the first bottom end portion abuts with the first stepped portion;
   a second placing step of placing the second end inside the second dome portion by moving, in the axial direction, at least either of the second dome portion and the pipe portion;
   a first joining step of, after the first placing step, joining the pipe portion to the first dome portion; and
   a second joining step of, after the second placing step, joining the pipe portion to the second dome portion.

2. The manufacturing method according to claim 1, wherein:
   the first forming step includes a winding step of winding a fiber around a mandrel in hoop winding; and
   the first stepped portion is formed in the first end portion such that a total number of winding on the second end side of the first end portion is made larger than a total number of winding on the first end side of the first end portion.

3. The manufacturing method according to claim 1, wherein:
   the first forming step includes a step of forming a second stepped portion in the second end portion such that the second stepped portion projects outwardly at a position distanced from the second end in the axial direction by a second distance determined in advance; and
   the second placing step includes a step of moving, in the axial direction, at least either of the second dome portion and the pipe portion until the second bottom end portion abuts with the second stepped portion.

4. The manufacturing method according to claim 1, further comprising a fourth forming step of, after the first joining step and the second joining step, forming a helical layer by providing fibers over the first dome portion and the second dome portion.

* * * * *